United States Patent
Bent et al.

(10) Patent No.: US 10,140,304 B1
(45) Date of Patent: Nov. 27, 2018

(54) DISTRIBUTED METADATA SERVERS IN A FILE SYSTEM WITH SEPARATE METADATA SERVERS FOR FILE METADATA AND DIRECTORY METADATA

(71) Applicant: EMC IP Holding Company LLC, Hopkinton, MA (US)

(72) Inventors: John M. Bent, Los Alamos, NM (US); Sorin Faibish, Newton, MA (US); Gary Grider, Los Alamos, NM (US)

(73) Assignees: EMC IP Holding Company LLC, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 246 days.

(21) Appl. No.: 14/965,257

(22) Filed: Dec. 10, 2015

(51) Int. Cl.
G06F 17/30 (2006.01)

(52) U.S. Cl.
CPC .... *G06F 17/30091* (2013.01); *G06F 17/3012* (2013.01); *G06F 17/30194* (2013.01)

(58) Field of Classification Search
CPC ......... G06F 17/30091; G06F 17/30194; G06F 17/3012; G06F 17/30707; G06F 17/30203; G06F 3/067; G06F 17/30; G06F 9/30043; G06F 3/0685; H04L 67/1097; H04L 67/10
See application file for complete search history.

(56) References Cited

U.S. PATENT DOCUMENTS

| | | | | |
|---|---|---|---|---|
| 7,010,721 B2* | 3/2006 | Vincent | ............. | G06F 17/30191 711/156 |
| 7,743,038 B1* | 6/2010 | Goldick | ................ | G06F 17/302 707/694 |
| 7,873,619 B1* | 1/2011 | Faibish | ............. | G06F 17/30091 707/705 |
| 8,700,683 B2* | 4/2014 | Cooney | ............. | G06F 17/30126 707/812 |

(Continued)

OTHER PUBLICATIONS

Piernas et al. "DualFS: a New Journaling File System without Meta-Data Duplication", ICS, Jun. 2002.

(Continued)

*Primary Examiner* — Anh Ly
(74) *Attorney, Agent, or Firm* — Ryan, Mason & Lewis, LLP

(57) ABSTRACT

A file system is provided having a plurality of distributed metadata servers with separate metadata servers for file metadata and directory metadata. An exemplary distributed metadata storage system comprises a plurality of compute nodes, wherein at least one compute node comprises a file system client that generates a directory metadata request and/or a file metadata request; a plurality of directory metadata servers to serve directory metadata in response to a given directory metadata request; and a plurality of file metadata servers to serve file metadata in response to a given file metadata request. The plurality of directory metadata servers are distinct from the plurality of file metadata servers. The compute nodes optionally comprise an object client that requests object data from an object store system.

(Continued)

The number of directory metadata servers and the number of file metadata servers are optionally determined independently to balance for different workloads, and can be dynamically readjusted for evolving workloads.

21 Claims, 12 Drawing Sheets

(56) References Cited

U.S. PATENT DOCUMENTS

| | | | | |
|---|---|---|---|---|
| 9,197,703 | B2 * | 11/2015 | Mysur | G06F 17/30203 707/E17.004 |
| 9,305,010 | B1 * | 4/2016 | Faibish | G06F 17/30174 707/E17.009 |
| 9,852,146 | B1 * | 12/2017 | Bent | G06F 17/30171 707/E17.017 |
| 2009/0019098 | A1 * | 1/2009 | Gunda | G06F 11/004 714/E11.144 |
| 2012/0330904 | A1 * | 12/2012 | Factor | G06F 17/30156 707/692 |
| 2013/0103729 | A1 * | 4/2013 | Cooney | G06F 17/30126 707/831 |
| 2013/0185258 | A1 * | 7/2013 | Bestler | G06F 17/30197 707/638 |
| 2013/0218934 | A1 * | 8/2013 | Lin | G06F 17/30194 707/828 |
| 2014/0188953 | A1 * | 7/2014 | Lin | G06F 17/30203 707/827 |
| 2016/0034507 | A1 * | 2/2016 | Aron | G06F 17/30115 707/722 |
| 2016/0034590 | A1 * | 2/2016 | Endras | G06Q 30/0278 707/770 |

OTHER PUBLICATIONS

Lustre (file system) downloaded on Dec. 10, 2015, https://en.m.wikipedia.org/wiki/Lustre_(file_system).

Welch et al., "Scalable Performance of the Panasas Parallel File System", Proceedings of the 6th USENIX Conference on File and Storage Technologies (FAST '08), San Jose, CA, Feb. 2008.

Patil et al., "Scale and Concurrency of GIGA+: File System Directories with Millions of Files", Proceedings of the 9th USENIX Conference on File and. Storage Technologies (FAST '11), San Jose CA, Feb. 2011.

Colin Faber, "Lustre DNE (Distributed Namespace) basics", UNIXgr, posted on Jan. 25, 2014, http://www.unixgr.com/lustre-dne-distributed-namespace-basics/.

U.S. Appl. No. 14/663,634, filed Mar. 20, 2015, entitled "Distributed Metadata Servers for Cluster File Systems Using Shared Low Latency Persistent Key-Value Metadata Store".

U.S. Appl. No. 13/931,833, filed Jun. 29, 2013, entitled "Cluster File System with Metadata Server for Storage of Parallel Log Structured File System Metadata for a Shared File".

U.S. Appl. No. 14/579,323, filed Dec. 22, 2014, entitled "Key-Value Store With Internal Key-Value Storage Interface".

"Lustre: A Scalable, High-Performance File System Cluster File Systems, Inc.", downloaded from info@clusterfs.com on Apr. 4, 2018.

Gregoire Pichon, "Lustre 2.8 feature: Multiple metadata modify RPCs in parallel", downloaded from https://www.eofs.eu/_media/events/lad15/14_gregoire_pichon_lad2015_lustre_2_8_multiple_modify_rpcs.pdf on Apr. 4, 2018.

"Lustre File System", downloaded from https://www.nersc.gov/assets/ NUG-Meetings/NERSCLustre.pdf.

* cited by examiner

*FIG. 4*

```
400 const delimiter = ";"  // some delimiter is needed for string entries where multiple values are stored /* helper function to get the responsible directory MDS for an entry
 * the N directory mds servers are stored in an array
 */
get_dmds(entry e) {
    return dir_mds_servers[hash(e) %dir_mds_servers.length()];
}

/* function to walk the tree (e.g., traverse to directory /a/b/c
 * first look up the root dir
 * note that the filesystem client should typically cache the upper level
 * dirs so most of this will be fast
 */
tree_walk(path p) {
    // first get the MDS storing the root, then start looking up the path components
    current_mds = get_dmds('/')
    current_dir = '/'
    components = split('/', p)
    for component in components {
        next_dir = current_mds->getxattr(current_dir + component, 'system.nxm.dirdata')
        next_mds = get_dmds(next_dir)
        current_mds = next_mds
        current_dir = next_dir
    }
    return (current_mds, current_dir)
}
```

*FIG. 5A*

```
/*
 * function to stat a file
 */
stat (path p) {
  parent = remove_last_component(p)
  (mds,dir) = tree_walk (parent)
  return mds->stat(dir+strip_last_component(p))
}
/*
 * function to read a directory
 */
readdir(path p) {
  parent = remove_last_component(p)
  (mds,dir) = tree_walk (parent)

// have the mds and the dirname that stores this directory
  // its contents will be stored in multiple locations
  // its children directories will be directly in it
  // its children files will be stored in lots of different directories
  // find them in the xattr that has a value like {MDS.[3-6]}:3d837c8f // create an array of arrays called dirs in which each entry is a [mds,dir] pair
  // this is because each directory to be searched is actually stored on a
  // different mds, so to do a readdir of it, need both its name and the mds
  on which it is stored dirs = [ [mds,dir] ]
  children = mds->getxattr(dir, 'system.nxm.dirfiles')
  (mdses,dir) = split (delimiter,children)
  foreach mds in mdses {
    dirs.append( [mds,dir] )
  }
```

FIG. 5B

```
// array of arrays is available, where each one is an mds and a dir on that mds
// instead of building an array, a readdir can be performed on each
// but instead an array was employed, so multi-threaded readdir operations are easier // create a container for p's entries
// p's entries actually are spread across all the dirs so pass the container to
// each thread reading from each dir. This means the container needs to be thread-safe
entries = new thread_safe_container
threads = new array   // store our children threads so we can wait on them
foreach dir in dirs {
    threads.append(new thread(&thread_readdir,entries,dir.mds,dir.dir)
~~
wait (threads)
return entries
~~
```

```
/*
 * a uniquifer function          ⟵ 600
 */
uniquifier(string s) {
    // use any well-known method to create a unique string
    // such as a 128bit hash or whatever
}

⟵ 650
/*
 * the function that each readdir thread executes
 */
thread_readdir(entries,mds,dir) {
  dp = mds->opendir(dir)
  foreach entry in dp->readdir
    entries.insert(entry)
}
```

FIG. 7A

```
/*
 * function to mkdir
 */
mkdir(path p) {
    // there are three things to do in this function
    // 1. make the top-level entry in the parent directory of this path
    //    e.g. if the path is /a/b/c/d then make a 'd' entry in 'c'
    // 2. then make the actual anonymous directory
    // 3. then link the actual anonymous directory to the top-level entry
    // The order of steps 1 and 2 doesn't really matter except for failure-recovery
    // So the actual implementation will make these two operators appear "atomic"
    // Such methods are well-known, such as write-ahead logs and transactions // Step 1: the top-level will be stored in the parent
    parent = remove_last_component(p)
    (parent_mds,parent_dir) = tree_walk (parent)
    parent_mds->mkdir(parent_dir, p)

// Step 2: the actual directory will be stored in a different mds
    dirname = strip_last_component(p)
    mds = get_dmds(dirname)
    unique = uniquifier(dirname)
    mds->mkdir(unique)

// Step 3:
    parent_mds->setxattr(parent_dir, 'system.nxm.dirdata', string(mds) + delimiter + unique)
```

```
// Step 4:
  // another possible thing we could do here would be to proactively
  // make the M file directories and set the system.nxm.dirfiles accordingly
  // this could be delayed until individual files are created and then do it lazily
  // here it is shown how to do it eagerly.
  // if it were to be in the creat function (FIG. 8), they could be processed one at a time
  as necessary or all at once.
  for fmds in file_metadata_servers { // file metadata servers is an array holding our M
  file metadata servers
      fmds->mkdir(unique)
  }

// Step 5:
  // notice that steps 4 and 5 have the same atomicity requirements as do 1-3
  mds->setxattr(unique, 'system.nxm.dirfiles', str(file_metadata_servers) + delimiter +
  unique)
}

/*
 * helper function to get appropriate file mds
 */
get_fmds(mds,dir) {
  file_metadata_servers = array (split (delimiter,mds->getxattr(dir, 'system.nxm.dirfiles')))
  return (file_metadata_servers[0] [hash(dir)%file_metadata_servers.size()],
  file_metadata_servers[1])
}
```

```
/*
 * function to create file
 */
creat (path p) {
  // find the parent directory from the directory metadata servers
  parent = remove_last_component(p)
  (parent_mds,parent_dir) = tree_walk (parent)
  fname = strip_last_component(p)

// from it, find the file directory from the file metadata servers
  // if Step 5 was not performed in mkdir, check that here and do it here instead
  (fmds,fdir) = get_fmds(parent_mds,parent_dir)
  fmds->creat(fdir,fname)
}
```

FIG. 9

```
/*
 * function to write file
 */
write (path p, offset_t off, len_t len, char *buffer) {
    // note that the following code is the same as some of the creat code above // find the parent directory from the directory metadata servers
    parent = remove_last_component(p)
    (parent_mds,parent_dir) = tree_walk(parent)
    fname = strip_last_component(p)

// from it, find the file directory from the file metadata servers
    // if we didn't do Step 5 in mkdir, we could check that here and do it here instead
    (fmds,fdir) = get_fmds(parent_mds,parent_dir)

// now the rest of this code is specific to write (or read)
    // note that some object stores have only full get/put semantics and this function uses
    byte-range semantics
    // the conversion is trivial to make this work for object stores that only have full
    get/put semantics
    OID o = fmds->getxattr(fdir+"/"+fname,"system.nxm.oid")
    object_store->write(o,off,len,buffer)
}
```

900

DISTRIBUTED METADATA SERVERS IN A FILE SYSTEM WITH SEPARATE METADATA SERVERS FOR FILE METADATA AND DIRECTORY METADATA

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The field relates generally to data storage, and more particularly, improved techniques for storing metadata.

BACKGROUND

Metadata is additional data that describes the actual data. For example, metadata can be used in file systems to describe where the corresponding data is stored. Cluster file systems, for example, allow multiple client devices to share access to files over a network. For many cluster file systems, especially for High Performance Computing (HPC) applications such as the Linux-based Lustre file system or the General Parallel File System (GPFS) developed by IBM Corp., the metadata servers (MDSs) are a bottleneck that reduce performance gains that would otherwise be available due to the intended parallel data access.

A number of techniques have been proposed or suggested to improve metadata access using distributed metadata servers. U.S. patent application Ser. No. 14/663,634, filed Mar. 20, 2015 (now U.S. Pat. No. 9,852,146), entitled "Distributed Metadata Servers for Cluster File Systems Using Shared Low Latency Persistent Key-Value Metadata Store," incorporated by reference herein, discloses a cluster file system having a plurality of distributed metadata servers with shared access to one or more shared low latency persistent key-value metadata stores.

A need therefore exists for improved metadata servers using separate metadata servers for file metadata and directory metadata.

SUMMARY

Illustrative embodiments of the present invention provide a file system having a plurality of distributed metadata servers with separate metadata servers for file metadata and directory metadata. In one embodiment, a distributed metadata storage system comprises a plurality of compute nodes, wherein at least one of the compute nodes comprises a file system client that generates one or more of a directory metadata request and a file metadata request; a plurality of directory metadata servers to serve directory metadata in response to a given directory metadata request; and a plurality of file metadata servers to serve file metadata in response to a given file metadata request, wherein the plurality of directory metadata servers are distinct from the plurality of file metadata servers, and wherein the plurality of directory metadata servers and the plurality of file metadata servers are connected to the plurality of compute nodes using at least one network.

In at least one embodiment, a file system is layered over an object store and an object store is used for data storage and a file system is used for namespace management. Thus, the compute nodes optionally comprise an object client that requests object data from an object store system.

In one or more embodiments, the plurality, N, of directory metadata servers and the plurality, M, of file metadata servers are determined independently to balance for different workloads. In addition, the values of N and M are optionally dynamically readjusted for evolving workloads.

As noted above, illustrative embodiments described herein provide significant improvements relative to conventional metadata storage arrangements. In some of these embodiments, use of separate metadata servers for file metadata and directory metadata removes interference between common namespace traversals and file modifications and thereby allows improved metadata access. In at least one embodiment, a directory traversal evaluates only directory metadata in one or more of the plurality of directory metadata servers, without evaluating file metadata.

BRIEF DESCRIPTION OF THE DRAWINGS

FIG. 4 illustrates exemplary pseudo code for a directory traversal operation in accordance with an embodiment of the invention;

FIGS. 5A and 5B, collectively, illustrate exemplary pseudo code for a directory read function;

FIG. 6 illustrates exemplary pseudo code for a uniquifer function and a read directory function in accordance with embodiments of the invention;

FIGS. 7A and 7B, collectively, illustrate exemplary pseudo code for a make directory function;

FIG. 8 illustrates exemplary pseudo code for a create file function in accordance with an embodiment of the invention;

FIG. 9 illustrates exemplary pseudo code for a write file function in accordance with an embodiment of the invention;

DETAILED DESCRIPTION

Figure 1:
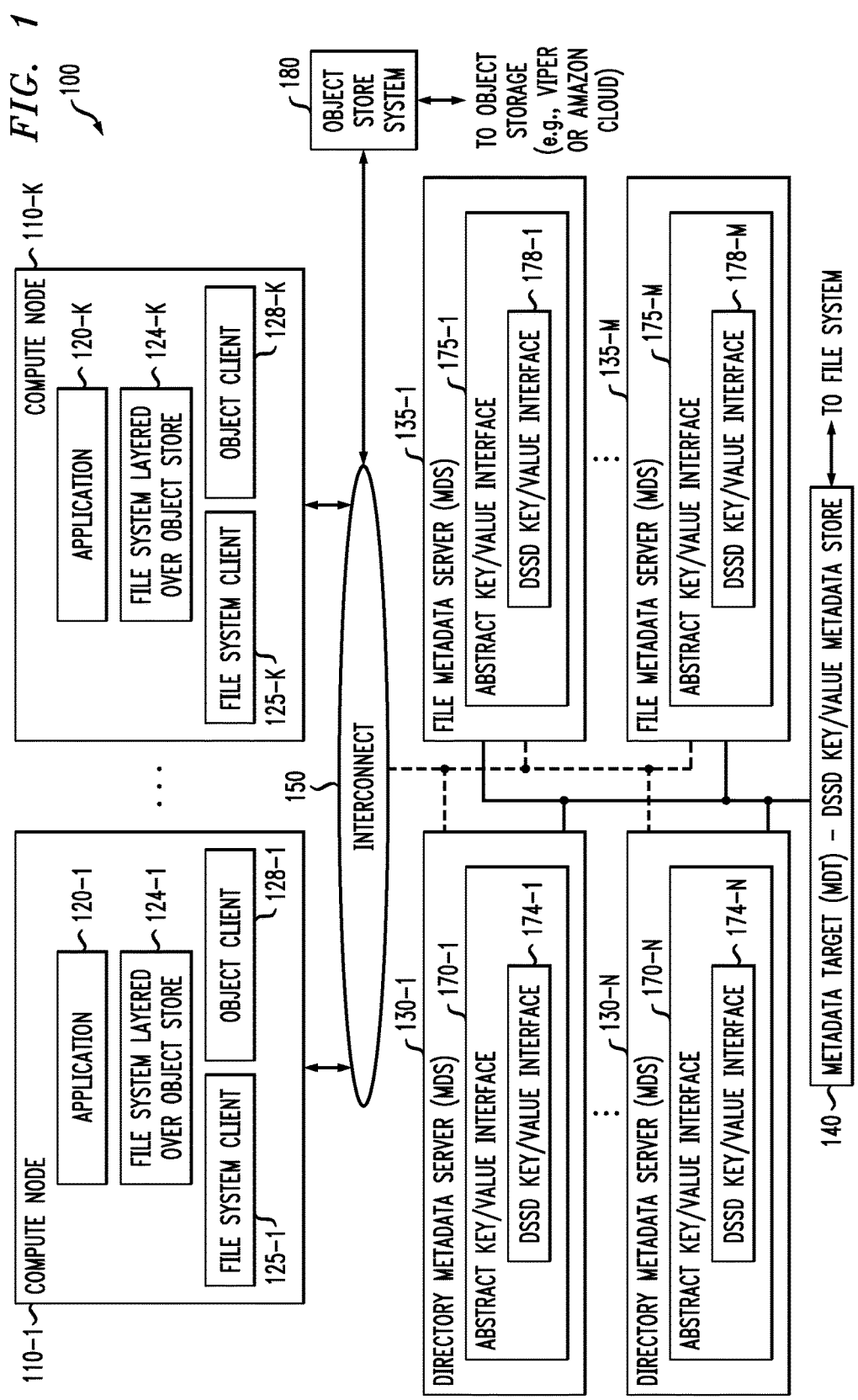
FIG. 1 illustrates an exemplary metadata storage environment incorporating aspects of the present invention.

Illustrative embodiments of the present invention will be described herein with reference to the storage of data and metadata generated by an exemplary parallel computing system and associated clients, servers, storage arrays and other processing and storage devices. It is to be appreciated, however, that the invention is not restricted to use with the particular illustrative parallel computing system, file system, storage system and device configurations shown. Accordingly, the terms "file system," "parallel computing system" and "storage system," as used herein, are intended to be broadly construed.

According to one aspect of the invention, a plurality of distributed metadata servers in a file system comprise N separate metadata servers for directory metadata and M separate metadata servers for file metadata. By further sharding directory metadata and file metadata across N and M metadata servers, respectively, N×M scaling of metadata performance is achieved by employing N metadata servers to serve directory metadata and employing M metadata servers to serve file metadata.

One or more embodiments provide independent provisioning of metadata server resources for each type of workload by allowing the parameters N and M to be set independently to balance appropriately for different workloads. For example, assume a given metadata storage environment has seven available metadata servers and that that metadata workloads have been observed to be slightly more file intensive than they are directory intensive. Therefore, in one exemplary implementation, four of the metadata servers can be assigned to process file metadata and three metadata servers can be assigned to process directory metadata. In addition, the load balancing can be dynamically adjusted for evolving workloads when the metadata is stored on a shared media, such as the DSSD™ flash storage system from EMC Corp. In this manner, N and M can optionally be dynamically readjusted for evolving workloads.

In one exemplary embodiment, the distributed metadata servers have shared access to one or more low latency persistent key-value metadata stores, such as the DSSD™ flash storage system from EMC Corp. According to a further aspect of the invention, the plurality of distributed metadata servers each provide an abstract storage interface into which key-value metadata operations are applied, and then passed to the one or more shared low latency persistent key-value metadata stores. As discussed herein, the exemplary abstract storage interface maintains semantic information when storing metadata to storage and optionally supports low latency batch operations so that groups of key-value pairs can be processed at once. While the present invention is illustrated herein in the context of an exemplary key-value storage system, the invention may be employed in any storage system for the storage of metadata, as would be apparent to a person of ordinary skill in the art.

In at least one embodiment, a file system is layered over an object store, with Portable Operating System Interface (POSIX)-style metadata servers and at least a portion of file data stored in an object system. In this manner, metadata and data are separated by storing data in an entirely different storage system such as in an object store. The 2Tier™ file system from EMC Corp. and the MarFS™ file system from Los Alamos National Security, LLC, for example, provide near-POSIX global namespaces over a number of POSIX and non-POSIX data repositories (e.g., scalable object systems). These systems use object stores for data storage and file systems for namespace management. Both of these systems have grown to address the increasingly large data sets found both in big data analytics, as well as in high performance analytics.

In an exemplary 2Tier™ system, multiple subsets of a global namespace are simultaneously loaded and unloaded. In this scenario, there will be a large need for efficient directory traversal since the portion of the namespace that is initially loaded is directory intensive whereas older portions of the namespace will be file intensive. In this scenario, the appropriate balance between directory metadata service and file metadata service can be set. In an exemplary MarFS™ system, trillions of objects can co-exist within a single POSIX namespace. The mean directory size is a reasonable approximation of the appropriate ratio of N to M for directory and file metadata servers.

Aspects of the present invention recognize that a number of emerging storage devices provide a key-value interface. For example, the DSSD™ flash storage system from EMC Corp. comprises a key-value flash-based storage system. Although flash memory will often be used for the high-speed memory of the shared low latency persistent key-value metadata stores, other types of low-latency memory could be used instead of flash memory. Typically, such low-latency memories comprise electronic memories, which may be implemented using non-volatile memories, volatile memories or combinations of non-volatile and volatile memories. Accordingly, the term "shared low latency persistent key-value metadata store," as used herein, is intended to be broadly construed so as to encompass any persistent storage device or other arrangement of hardware and associated software or firmware that collectively provides a high-speed, low latency storage media for persistent storage of key-value data and metadata using a key-value interface.

In one exemplary embodiment of the present invention, the abstract storage interface is included as a new storage layer in the metadata servers to leverage knowledge of the key-value storage interface of the low latency persistent storage destination. In this manner, the semantic information associated with the metadata can be stored by the metadata servers in the one or more shared low latency persistent key-value metadata stores that provide a key-value interface. The metadata servers can store key-value metadata using direct key-value operations on the shared low latency persistent key-value metadata stores. As used herein, a hardware accelerated metadata server comprises a metadata server that is substantially optimized for the storage of key-value metadata and/or communication using keys and values, thereby allowing direct calls to the hardware layer.

FIG. 1 illustrates an exemplary metadata storage environment 100 incorporating aspects of the present invention. As shown in FIG. 1, an exemplary application 120-1 through 120-K executing on a plurality of compute nodes 110-1 through 110-K can read, write and/or query data, such as objects, byte ranges and/or key-value data using a corresponding file system layered over an object store 124-1 through 124-K, a corresponding file system client 125-1 through 125-K and/or object client 128-1 through 128-K, in a known manner.

In order to store, obtain or modify metadata, the file system clients 125-1 through 125-K communicate with N exemplary directory metadata servers 130-1 through 130-N (hereinafter, MDS 130) and M exemplary file metadata servers 135-1 through 135-M (hereinafter, MDS 135) over an interconnect 150 or a network (not shown). The exemplary directory metadata servers (MDS) 130 and file metadata servers (MDS) 135 provide metadata services for the file system and manage a metadata target (MDT) 140 that stores the directory and file metadata.

In one exemplary embodiment, the directory metadata servers 130 and file metadata servers 135 are implemented as conventional Lustre metadata servers, as modified herein to provide features and functions of the present invention. In addition, the exemplary metadata target is implemented as a DSSD™ key/value metadata store 140 or another shared low latency persistent key-value metadata store.

The source code for the exemplary Lustre metadata servers 130 can be obtained, for example, from http://lustre.org/download/. Additional details regarding conventional aspects of an exemplary Lustre file system may be found in, for example, Cluster File Systems, Inc., "Lustre: A Scalable, High-Performance File System," pp. 1-13 (November 2002); F. Wang et al., "Understanding Lustre File system Internals," Tech Report ORNL/TM-2009/117, pp. 1-95 (April 2010), and Metadata Servers, http://wiki.lustre.org/index.php/FAQ_-_Metadata_Servers, which are each incorporated by reference herein. See also, U.S. patent application Ser. No. 13/931,833, filed Jun. 29, 2013 (now U.S. Pat. No. 9,811,530), entitled "Cluster File System with Metadata Server for Storage of Parallel Log Structured File System Metadata for a Shared File," and/or U.S. patent application Ser. No. 14/663,634, filed Mar. 20, 2015 (now U.S. Pat. No. 9,852,146), entitled "Distributed Metadata Servers for Cluster File Systems Using Shared Low Latency Persistent Key-Value Metadata Store," each incorporated by reference herein.

As shown in FIG. 1, the exemplary directory metadata servers 130 and file metadata servers 135 comprise N corresponding abstract key/value interfaces 170-1 through 170-N and M corresponding abstract key/value interfaces 175-1 through 175-M, respectively. Abstract key/value interfaces 170-1 through 170-N further comprise corresponding DSSD™ key/value interfaces 174-1 through 174-N. Abstract key/value interfaces 175-1 through 175-M further comprise corresponding DSSD™ key/value interfaces 178-1 through 178-M. Thus, the exemplary conventional Lustre metadata servers are modified to include the abstract storage interfaces 170, 175 (storage layer) into which key-value metadata operations are applied, and then passed to one or more persistent storage devices providing a key-value interface, such as the exemplary DSSD™ key/value metadata store 140.

The abstract storage interfaces 170, 175 provide a storage-specific interface, such as interface 174 and interface 178, for each type of storage destination, such as the exemplary DSSD™ key/value metadata store 140, and can therefore leverage knowledge about the specific storage destination to ensure that the semantic information associated with the stored key-value metadata is maintained. For example, the exemplary abstract storage interfaces 170, 175 comprise a DSSD™ key-value interface 174, 178, respectively, for storing key-value data in the exemplary DSSD™ shared low latency persistent key-value metadata store 140. As noted above, the exemplary DSSD™ key-value metadata store 140 provides a key-value interface.

When key-value metadata is stored using a key-value interface that maintains the semantic information associated with the stored key-value data, the metadata can be accessed more easily. See, for example, U.S. patent application Ser. No. 14/579,323, filed Dec. 22, 2014 (now U.S. Pat. No. 9,870,168), entitled "Key-Value Store With Internal Key-Value Storage Interface," and incorporated by reference herein, for a discussion of key-value interfaces that maintain semantic information.

In addition, the exemplary DSSD™ key-value metadata store 140 permits global availability across the multiple compute nodes 110-1 through 110-K. Further, the exemplary DSSD™ key-value metadata store in accordance with one or more embodiments of the present invention permits a relaxed namespace partitioning that allows any directory metadata server 130 to access any directory portion of the namespace and allows any file metadata server 135 to access any file portion of the namespace, up to a fixed number of metadata servers. In addition, the metadata can all be maintained in the DSSD™ key-value metadata store 140 without caches in the metadata servers 130, 135 because the shared low latency DSSD™ persistent key-value metadata store 140 allows a greater degree of parallelization without the round-trip coordination required with conventional techniques.

Thus, the flexibility of the abstract storage interfaces 170, 175 allows the exemplary metadata storage environment 100 to be easily adapted to a variety of emerging storage environments, such as the exemplary DSSD™ flash storage system, and to leverage additional low latency persistent storage architectures that provide key-value interfaces. While the exemplary embodiments of the present invention employ DSSD™ flash storage system, other storage devices can be employed, as would be apparent to a person of ordinary skill in the art.

The abstract storage interfaces 170, 175 optionally performs any necessary conversions/translations to leverage, for example, flash storage devices that provide key-value interfaces for storing metadata. In this manner, the metadata servers 130, 135 provide a key-value interface 170, 175, respectively, to one or more additional low latency persistent storage devices having a key-value interface.

Each shared low latency persistent key-value metadata store 140, such as the exemplary DSSD™ key-value metadata store 140, in the present embodiment is assumed to comprise a flash memory or other high-speed memory having a substantially lower access time than storage disks. More than one shared low latency persistent key-value metadata store 140 can be employed with mirroring of the metadata between them if each individual DSSD™ key-value metadata store 140 does not provide sufficiently high-availability. In the event of multiple shared low latency persistent key-value metadata stores 140, the locks must be held longer than in a standalone DSSD™ key-value metadata store 140 implementation, while the multiple shared low latency persistent key-value metadata stores 140 mirror the metadata updates.

It is noted that in a standalone DSSD™ key-value metadata store 140 implementation, only one copy of the metadata is stored in the single DSSD™ key-value metadata store 140, and multiple copies of metadata consistent across multiple metadata servers 130, 135 do not need to maintain consistency.

In addition, each metadata server 130, 135 comprises a processor coupled to a memory (not shown). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code.

Each metadata server 130, 135 may be implemented at least in part in the form of software that is stored in the memory and executed by the processor. Each metadata server 130, 135 comprising a processor, a memory and network interface components as described above is an example of what is more generally referred to herein as a "processing device." Each of the devices described herein may similarly be implemented as a processing device comprising a processor, a memory and network interface components.

The DSSD™ key-value interfaces 174, 178 store the key-value metadata pairs by writing the key-value metadata pairs directly to the shared low latency persistent key-value metadata store 140. Therefore, the semantic information associated with the key-value data stored on storage 140 is maintained.

With semantic knowledge in the one or more shared low latency persistent key-value metadata store 140, processors in these storage devices can optionally assist with operations such as index building, reorganization, resorting, deduplication and compression.

While the exemplary embodiment employs flash memory as a high-speed memory in the more shared low latency persistent key-value metadata store 140, other types of low-latency memory could be used instead of flash memory. Typically, such low-latency memories comprise electronic memories, which may be implemented using non-volatile memories, volatile memories or combinations of non-volatile and volatile memories.

Conventional techniques employ multiple metadata servers and partition the namespace across them. This requires distributed ACID (Atomicity, Consistency, Isolation, Durability) transactions, however, for operations that affect multiple portions of the namespace, such as a rename operation. The rename operation in a conventional environment often involves two portions of the namespace (old path and new path) and the metadata server coordinator is only responsible for one portion of the namespace. Thus, the metadata server coordinator must enlist another metadata server that is responsible for the other affected portion of the namespace. The two metadata servers must perform multiple operations to ensure that the metadata changes are consistent. The namespace is partitioned to improve parallelization so that each metadata server 130, 135 can cache pieces of the namespace, as necessary, without worrying about shared cache consistency.

As noted above, in at least one embodiment, a file system is layered over an object store, with POSIX-style metadata servers and at least a portion of file data stored in an object system. In this manner, metadata and data are separated by storing data in an entirely different storage system. As shown in FIG. 1, each compute node 110 includes an object client 128 for requesting object data from an object store system 180. The object store system 180 provides access to object storage, such as ViPR® software-defined storage from EMC Corp. or Cloud Storage from Amazon Corp.

Figure 2:
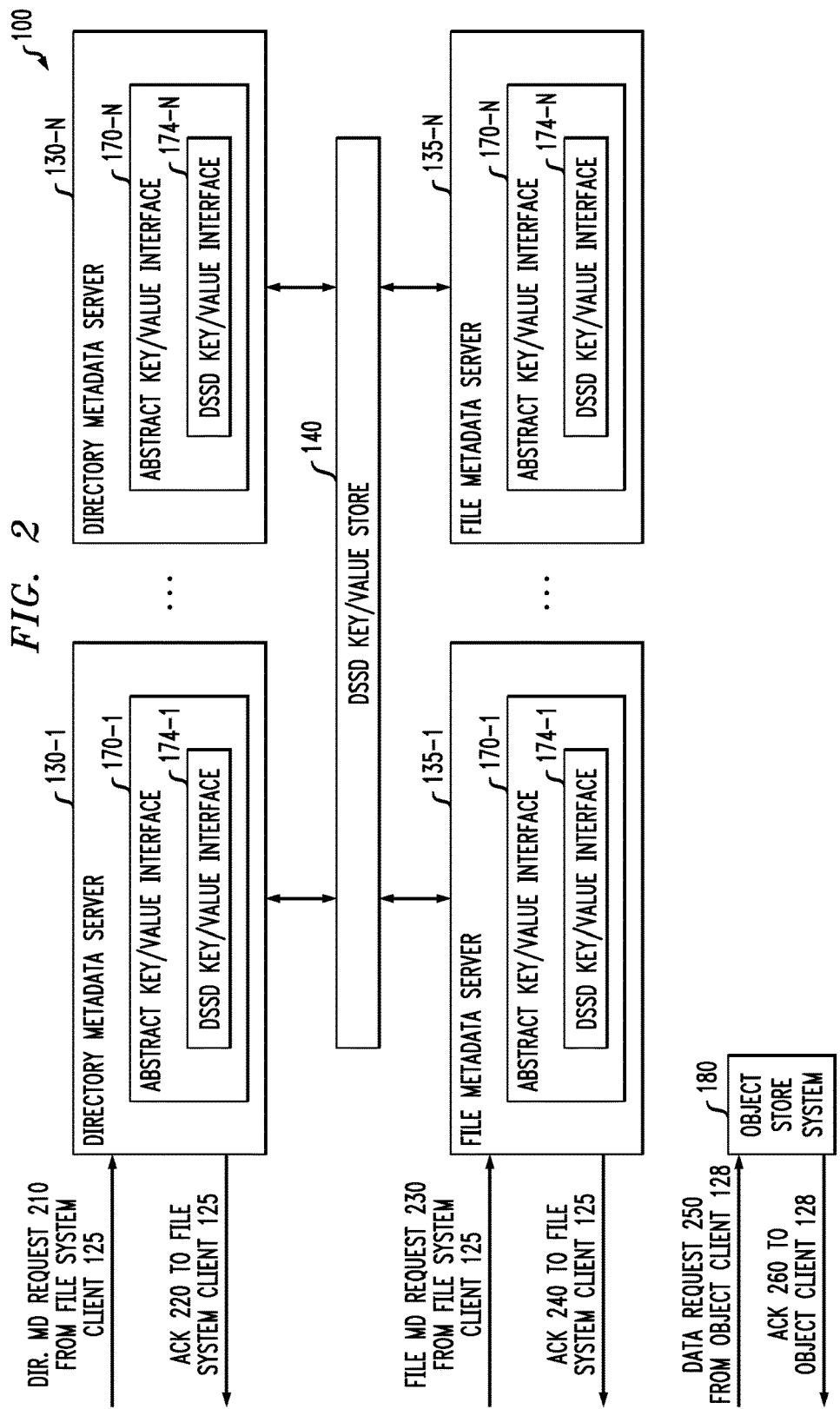
FIG. 2 illustrates metadata and data access in the metadata storage environment of FIG. 1.

FIG. 2 illustrates uncoordinated metadata and data access in the metadata storage environment 100 of FIG. 1. As shown in FIG. 2, a directory metadata request 210 from a file system client 125 is received by a directory metadata server, such as directory metadata server 130-1. The request 210 may comprise, for example, a directory rename operation. The request 210 can also comprise basic directory operations, such as to create or remove a directory. These basic directory operations are also improved by one or more embodiments of the present invention, as better load balancing is achieved because any of the directory metadata servers 130 can process the request 210 and access the shared low latency persistent key-value metadata store 140.

As shown in FIG. 2, the request 210 from the file system client 125 can be processed by directory metadata server 130-1 without contacting any of the other directory metadata servers 130. After completing processing of the request 210, the directory metadata server 130-1 provides an acknowledgement (ACK) 220 to the requesting file system client 125.

As shown in FIG. 2, a file metadata request 230 from a file system client 125 is received by a file metadata server, such as file metadata server 135-1. The request 230 may comprise, for example, a file rename operation. The request 230 can also comprise basic file operations, such as to create or remove a file. These basic file operations are also improved by one or more embodiments of the present invention, as better load balancing is achieved because any of the file metadata servers 135 can process the request 230 and access the shared low latency persistent key-value metadata store 140.

As shown in FIG. 2, the request 230 from the file system client 125 can be processed by file metadata server 135-1 without contacting any of the other file metadata servers 135. After completing processing of the request 230, the file metadata server 135-1 provides an acknowledgement (ACK) 240 to the requesting file system client 125.

A data request 250 from an object client 128 is received by the object store system 180. The request 250 may comprise, for example, a request to access an object. After completing processing of the data request 250, the object store system 180 provides an acknowledgement (ACK) 260 to the requesting object client 128.

Figure 3:
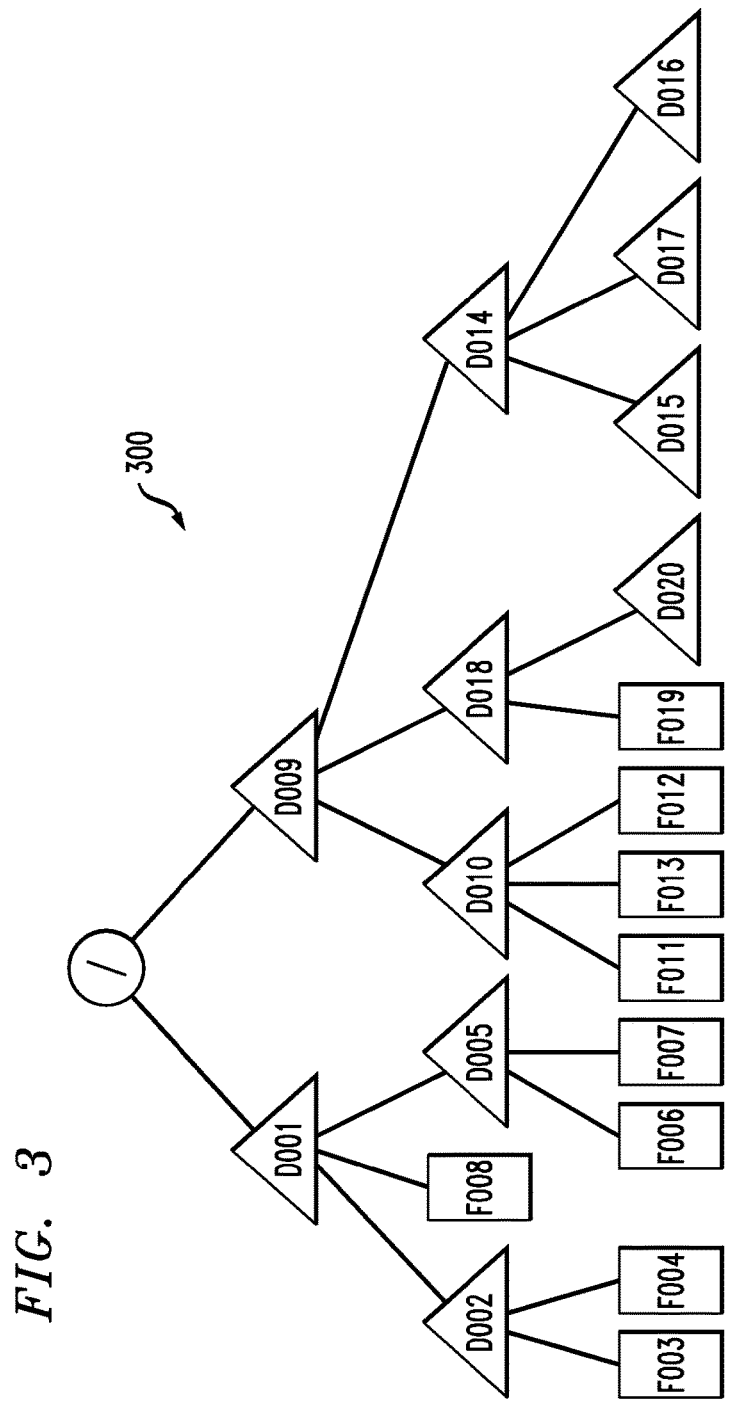
FIG. 3 illustrates an exemplary namespace having a plurality of directories and files.

FIG. 3 illustrates an exemplary namespace 300 having a plurality of directories and files. Directories in the namespace 300 are shown as triangles and their names are prefaced with the letter "D". Files in the namespace 300 are shown as squares and their names are prefaced with the letter "F."

In a conventional storage system, metadata access for modifications to files would interfere with namespace traversals since the metadata servers would be shared. In the above exemplary implementation, where four metadata servers are assigned to process file metadata and three metadata servers are assigned to process directory metadata, a policy is employed to hash the directory names in order to assign them to one of the three metadata servers. Notice that there are two types of metadata associated with each directory. The first type of metadata is the top-level metadata, which describes that directory such as ownership, timestamps, permissions, and name. The second type of metadata for a directory is often referred to as the data contents of the directory which means the information about the children (i.e., the contents) of that directory.

With reference to FIG. 3, the representative metadata for directory D001 is as follows:
  ownership: johnbent;
  timestamp: 1440027378;
  owner permissions: rwx (read/write/execute);
  group permissions: r-x (read and execute);
  other user permissions: r - - (read only).

The contents of directory D001, as shown in FIG. 3, are F008, D002 and D005. Assume that the three exemplary directory metadata servers 130 are referred to as MDS.0, MDS.1, and MDS.2.

The top-level metadata for directory D001 will be stored in its parent directory (i.e., the root directory "/") which will have a child directory named D001 with the above top-level attributes (ownership, timestamp, permissions). This parent directory must also be stored. To store the parent directory, its name (i.e., "/") is hashed across the set of available metadata servers. Assume the hash operation returns metadata server MDS.1. Therefore, a directory is created for the root directory ("/") in MDS.1; canonically referred to as MDS.1:/. When directory D001 is stored into the root directory ("/"), a D001 directory is created in MDS.1:/ and its top-level metadata (e.g., owner, timestamp, permissions) is stored there using standard tools.

Now, to store the contents of D001, directory D001 is hashed. Assume the hash operation returns metadata server MDS.0. An anonymous directory is created on MDS.0. The directory is intentionally anonymous so that its name is stored only in one location (i.e., in MDS.1:/). A uniquifying function is used to create an anonymous directory and produce an anonymous name. In one exemplary optimization, the anonymous directories need not be stored in a flat namespace, in case that the metadata servers perform better with smaller directories. In such a case, a multi-level directory space is created with dimensions x and y. Then, placing an anonymous directory into this multi-level directory space requires additional hash functions to select x and y.

Assume that the unique name of directory D001 is 'e97e99a3', so a directory of that name is created on metadata server MDS.0 (i.e., MDS.0:e97e99a3). The anonymous directory is linked back into its entry in the POSIX namespace (i.e., MDS.1:/D001). Therefore, an extended attribute is inserted for directory MDS0.1:/D001:

system.nxm.dirdata: MDS.0:e97e99a3

It is noted that some file systems, such as the General Parallel File System (GPFS) developed by IBM Corp., have optimized lookup routines that allow direct queries and use of the actual i-node numbers. In such a case, the identifying i-node can be used for these anonymous directories instead of their unique strings.

The contents of directory /D001 (file F008 and directories D002 and D005) can be stored as follows. Directory D005, since it is a directory, will be stored as described above for directory /D001. File F008, however, is a file and will be stored into one of four file metadata servers 135 that are used to store file metadata, referred to as metadata servers MDS.3, MDS.4, MDS.5, and MDS.6.

In one or more embodiments, for each directory, an additional extended attribute is set identifying the metadata servers used to store the metadata for the files it contains. As an optional optimization, directories with a small number of files need not be distributed across all of file metadata servers 135 for storing file metadata. For the time being, assume that all four file metadata servers 135 are used. Therefore, an anonymous directory is created on each of the four exemplary file metadata servers 135 that will be used for storing the file metadata for this directory. Assume that this anonymous directories is 3d837c8f and the file metadata servers 135 are MDS.3, MDS.4, MDS.5, and MDS.6.

Therefore, for directory D001 (which is itself stored in MDS.0:e97e99a3), an extended attribute is stored into metadata server MDS.0:e97e99a3, as follows:

system.nxm.dirfiles: {MDS.[3-6]}:3d837c8f.

Now, this attribute can be compressed using a regular expression which will be useful for very large numbers of M. To store file F008, the file is hashed to, for example, 472eeca2, and the file is stored into one of the four anonymous directories using a second hash which, for example, selects to metadata server MDS.4. The actual file contents can be stored in one of three ways, to be listed immediately below. For all three methods, the system will first perform the identical initial operation of creating an empty 472eeca2 entry in its anonymous directory 3d837c8f on metadata server MDS.4.

1. Directly into the 472eeca2 entry in its anonymous directory 3d837c8f on metadata server MDS.4. This would be using the host file system that is providing the metadata service. It is noted that if the host file system itself separates metadata and data, then its services provide additional scalability.
2. In the exemplary MarFS™ file system, the F008 entry would be an empty file with an extended attribute pointing to one or more objects in an object store holding its data.
3. In an exemplary 2Tier™ storage system, the F008 entry would be a stub entry that alternates between the two above states.

FIG. 4 illustrates exemplary pseudo code for a directory traversal operation 400 in accordance with an embodiment of the invention. A directory traversal in accordance with the invention is efficient, since the traversal only needs to consult the directory metadata in the dedicated directory metadata servers, without having to filter any file metadata.

As shown in FIG. 4, the exemplary directory traversal operation 400 employs a helper function, get_dmds, to identify the responsible directory MDS for an entry. The exemplary directory traversal operation 400 walks the directory tree by first looking up the root directory, and then looking up the path components. For each remaining component in the path, the component is found in its extended attribute (e.g., system.nxm.dirdata) and the extended attributed are read to find the anonymous directory holding its contents. The upper level directory structure is optionally cached using standard file system clients.

FIGS. 5A and 5B, collectively, illustrate exemplary pseudo code for a directory read function 500. Given the identifier of the directory metadata server and the directory name that stores a given directory, the directory read function 500 stores the directory contents in multiple locations, with the children directories of the given directory stored directly in the directory. The children files of the given directory will be stored in many different directories, as indicated in the extended attribute (xattr) that has a value such as {MDS.[3-6]}:3d837c8f. An array of arrays is created (called dirs.) in which each entry is a [mds, dir] pair, where "dir" indicates the name of the directory, because each directory to be searched is actually stored on a different directory metadata server. Thus, to perform a read directory operation (readdir) 650, as discussed further below in conjunction with FIG. 6, of the given directory, both the directory name and the metadata servers on which the directory is stored are needed.

The directory tree is traversed as discussed above to find the target anonymous directory D. The extended attribute (e.g., system.nxm.dirfiles) is read and then the exemplary directory read function 500 spawns threads for each anonymous directory holding the children files and another thread to perform the read directory operation (readdir) 650 of the target anonymous directory D itself to find the children directories.

FIG. 6 illustrates exemplary pseudo code for a uniquifer function 600 and a read directory function 650 in accordance with embodiments of the invention. The exemplary uniquifer function 600 creates a unique string, such as a 128 bit hash. The read directory (readdir) function 650 is the function that each readdir thread executes.

FIGS. 7A and 7B, collectively, illustrate exemplary pseudo code for a make directory (mkdir) function 700. As shown in FIG. 7A, the exemplary make directory function 700 includes a first step to make the top-level entry in the parent directory of this path. For example, if the path is /a/b/c/d, then a "d" entry is made in directory "c". During a second step, the exemplary make directory function 700 makes the actual anonymous directory using the uniquifer function 600 of FIG. 6. The actual anonymous directory is linked to the top-level entry in the third step. It is noted that, in one or more embodiments, the order of steps one and two does not matter, except for failure recovery. An actual implementation will make these two operators appear "atomic."

As shown in FIG. 7B, the exemplary make directory function 700 optionally includes a fourth step to proactively make the M file directories in the file metadata servers and set the extended attribute (e.g., system.nxm.dirfiles) accordingly. The fourth step can be delayed until individual files are created (see, FIG. 8) and then do it lazily. In one variation, threads can be employed for the "for fmds in file_metadata_servers"loop to obtain parallel performance for creating all of the directories in the file metadata servers, as would be apparent to a person of ordinary skill in the art, based on the present disclosure.

To store information in the new directory, the file metadata will be stored in the file metadata servers. To find the new directory, step five links the directory metadata server(s) with the new directory. While FIG. 7B illustrates an eager implementation, a lazy implementation would be apparent to a person of ordinary skill in the art, based on the present disclosure, by moving it to the create function. If it were in the create function, they can be processed one at a time as necessary or all at once.

FIG. 8 illustrates exemplary pseudo code for a create file function 800 in accordance with an embodiment of the invention. As shown in FIG. 8, the exemplary create file function 800 finds the parent directory from the directory metadata servers 130 and then finds the file directory from the file metadata servers 135.

FIG. 9 illustrates exemplary pseudo code for a write file function 900 in accordance with an embodiment of the invention. As shown in FIG. 9, the exemplary write file function 900 initially finds the parent directory from the directory metadata servers 130, and then uses the parent directory to find the file directory from the file metadata servers 135. It is noted that some object store systems 180 have only full get/put semantics and this function uses byte-range semantics. The conversion is trivial to make this work for object stores that only have full get/put semantics. It is noted that a read function would be apparent to a person of ordinary skill in the art based on the write file function 900.

When storage systems have multiple metadata servers sharing a storage medium (see, e.g., U.S. patent application Ser. No. 14/663,634 (now U.S. Pat. No. 9,852,146), referenced above), the hashing of which metadata server is responsible for which piece of metadata is useful only for load balancing. Conversely, in shared-nothing systems, the hash is more important because only that particular metadata server can physically access the metadata. With shared storage, since all metadata servers can access all metadata, the hash can be changed dynamically to redistribute load as appropriate. For example, if the N directory metadata servers 130 are under-utilized and the M file metadata servers 135 are overloaded, then one of the N directory metadata servers can become one of the M file metadata servers and they can all adjust their loads accordingly.

The above-described implementation for the N-way scalability of the directory metadata service fully distributes directory metadata workloads. For example, if a single user had a very intensive directory workload, the single user would benefit from all N directory metadata servers 130. However, this is typically an unlikely scenario. A more likely need for N-way scalability is to distribute multiple users across N directory metadata servers 130 and not to distribute the workload of a single user. In such a scenario, a simpler implementation of N-way scalability is possible. In this implementation, only the root-level directories are hashed across the N directory metadata servers 130. Their sub-contents would be fully local to their individual directory metadata server 130. This coarser distribution solves the common case simply and efficiently.

CONCLUSION

The foregoing applications and associated embodiments should be considered as illustrative only, and numerous other embodiments can be configured using the techniques disclosed herein, in a wide variety of different cryptography applications.

It should also be understood that the metadata separation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The storage system may be implemented using one or more processing platforms. One or more of the processing modules or other components may therefore each run on a computer, storage device or other processing platform element. A given such element may be viewed as an example of what is more generally referred to herein as a "processing device."

Figure 10:
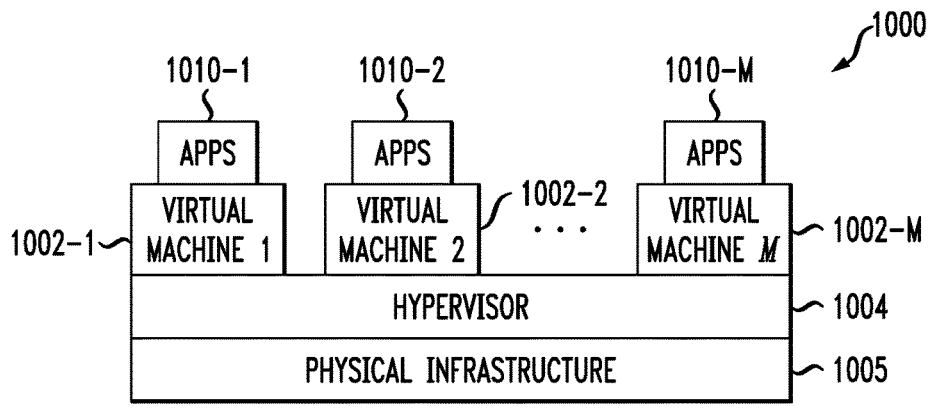
FIG. 10 illustrates an exemplary processing platform that may be used to implement at least a portion of one or more embodiments of the invention comprising a cloud infrastructure.

Referring now to FIG. 10, one possible processing platform that may be used to implement at least a portion of one or more embodiments of the invention comprises cloud infrastructure 1000. The cloud infrastructure 1000 in this exemplary processing platform comprises virtual machines (VMs) 1002-1, 1002-2, . . . 1002-M implemented using a hypervisor 1004. The hypervisor 1004 runs on physical infrastructure 1005. The cloud infrastructure 1000 further comprises sets of applications 1010-1, 1010-2, . . . 1010-M running on respective ones of the virtual machines 1002-1, 1002-2, . . . 1002-M under the control of the hypervisor 1004.

The cloud infrastructure 1000 may encompass the entire given system or only portions of that given system, such as one or more of client, servers, controller, authentication server or relying server in the system.

Although only a single hypervisor 1004 is shown in the embodiment of FIG. 10, the system may of course include multiple hypervisors each providing a set of virtual machines using at least one underlying physical machine.

An example of a commercially available hypervisor platform that may be used to implement hypervisor 1004 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective compute nodes or cloud storage nodes of a cloud computing and storage system. The compute nodes or metadata servers may be associated with respective cloud tenants of a multi-tenant environment of environment 100. Containers may be used in combination with other virtualization infrastructure such as virtual machines implemented using a hypervisor.

Figure 11:
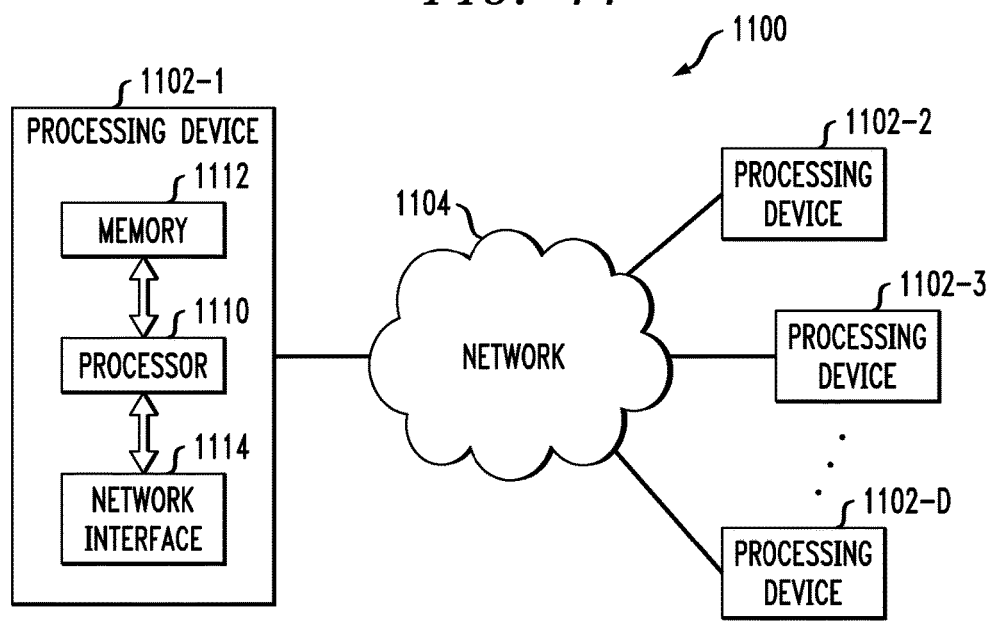
FIG. 11 illustrates another exemplary processing platform that may be used to implement at least a portion of one or more embodiments of the invention.

Another example of a processing platform is processing platform 1100 shown in FIG. 11. The processing platform 1100 in this embodiment comprises at least a portion of the given system and includes a plurality of processing devices, denoted 1102-1, 1102-2, 1102-3, . . . 1102-D, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "computer program product" having executable computer program code embodied therein, may comprise random access memory (RAM), read only memory (ROM) or other types of memory, in any combination.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 10 or 11, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of storage systems that can benefit from the metadata separation techniques disclosed herein. Also, the particular configuration of storage system and processing device elements shown herein, and the associated metadata separation techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A distributed metadata storage system, comprising:
a plurality of compute nodes, wherein at least one of said compute nodes comprises a file system client that generates one or more of a directory metadata request and a file metadata request;
a plurality of directory metadata servers to serve only directory metadata in response to a given directory metadata request;
a plurality of file metadata servers to serve only file metadata in response to a given file metadata request, wherein said plurality of directory metadata servers are distinct from said plurality of file metadata servers, and wherein said plurality of directory metadata servers and said plurality of file metadata servers comprise at least one processing device and are connected to said plurality of compute nodes using at least one network; and
at least one shared persistent key-value metadata store for storing said directory metadata and said file metadata, wherein said at least one shared persistent key-value metadata store is accessed by said plurality of directory metadata servers and said plurality of file metadata servers.

2. The distributed metadata storage system of claim 1, wherein at least one of said compute nodes comprises an object client that requests object data from an object store system.

3. The distributed metadata storage system of claim 1, wherein said plurality, N, of directory metadata servers and said plurality, M, of file metadata servers are determined independently to balance for different workloads.

4. The distributed metadata storage system of claim 1, wherein said plurality, N, of directory metadata servers and said plurality, M, of file metadata servers are dynamically readjusted for evolving workloads.

5. The distributed metadata storage system of claim 1, wherein each of said plurality of directory metadata servers and said plurality of file metadata servers comprises an abstract storage interface comprising a software interface module that communicates with said at least one shared persistent key-value metadata store.

6. The distributed metadata storage system of claim 5, wherein said abstract storage interface provides a storage-specific interface for said at least one shared persistent metadata store.

7. The distributed metadata storage system of claim 1, wherein a directory traversal evaluates only directory metadata in one or more of said plurality of directory metadata servers, without evaluating file metadata.

8. The distributed metadata storage system of claim 1, wherein a load is dynamically redistributed among said plurality of directory metadata servers and said plurality of file metadata servers by modifying an operation that is used to select one of said plurality of directory metadata servers and said plurality of file metadata servers.

9. A directory metadata server in a distributed metadata storage environment, comprising:
at least one processing device configured to obtain a directory metadata request from at least one file system client on at least one compute node, wherein said directory metadata server is dedicated to processing only directory metadata request types and wherein a plurality of file metadata servers in said distributed metadata storage environment are dedicated to processing only file metadata request types; and
at least one processing device configured to process said directory metadata request using at least one shared persistent key-value metadata store accessed by said directory metadata server and said plurality of file metadata servers.

10. The directory metadata server of claim 9, wherein said at least one compute node comprises an object client that requests object data from an object store system.

11. The directory metadata server of claim 9, wherein said directory metadata server is one of a plurality, N, of directory metadata servers and wherein said distributed metadata storage environment further comprises a plurality, M, of said file metadata servers, and wherein said N and M values are determined independently to balance for different workloads.

12. The directory metadata server of claim 9, wherein said directory metadata server is one of a plurality, N, of directory metadata servers and wherein said distributed metadata storage environment further comprises a plurality, M, of said file metadata servers, and wherein said N and M values are dynamically readjusted for evolving workloads.

13. The directory metadata server of claim 9, wherein said directory metadata server is one of a plurality, N, of directory metadata servers and wherein said distributed metadata storage environment further comprises a plurality, M, of said file metadata servers, and wherein each of said plurality of directory metadata servers and said plurality of file metadata servers comprises an abstract storage interface comprising a software interface module that communicates with said at least one shared persistent key-value metadata store.

14. The directory metadata server of claim 9, wherein a directory traversal evaluates only directory metadata in one or more of a plurality of said directory metadata servers, without evaluating file metadata.

15. A method performed by a directory metadata server in a distributed metadata storage environment, comprising the steps of:
obtaining, using at least one processing device, a directory metadata request from at least one file system client on at least one compute node, wherein said directory metadata server is dedicated to processing only directory metadata request types and wherein a plurality of file metadata servers in said distributed metadata storage environment are dedicated to processing only file metadata request types; and
processing said directory metadata request using at least one shared persistent key-value metadata store accessed by said directory metadata server and said plurality of file metadata servers.

16. The method of claim 15, wherein said at least one compute node comprises an object client that requests object data from an object store system.

17. The method of claim 15, wherein said directory metadata server is one of a plurality, N, of directory metadata servers and wherein said distributed metadata storage environment further comprises a plurality, M, of said file metadata servers, and wherein said N and M values are determined independently to balance for different workloads.

18. The method of claim 15, wherein said directory metadata server is one of a plurality, N, of directory metadata servers and wherein said distributed metadata storage environment further comprises a plurality, M, of said file metadata servers, and wherein said N and M values are dynamically readjusted for evolving workloads.

19. The method of claim 15, wherein said directory metadata server is one of a plurality, N, of directory metadata servers and wherein said distributed metadata storage environment further comprises a plurality, M, of said file metadata servers, and wherein each of said plurality of directory metadata servers and said plurality of file metadata servers comprises an abstract storage interface comprising a software interface module that communicates with said at least one shared persistent key-value metadata store.

20. The method of claim 15, wherein a directory traversal evaluates only directory metadata in one or more of a plurality of said directory metadata servers, without evaluating file metadata.

21. A non-transitory machine-readable recordable storage medium, wherein one or more software programs when executed by one or more processing devices implement the steps of the method of claim 15.

* * * * *